United States Patent
Matsumoto

(10) Patent No.: US 7,355,864 B2
(45) Date of Patent: Apr. 8, 2008

(54) SWITCHING REGULATOR AND ITS CONTROL METHOD

(75) Inventor: Shinichiro Matsumoto, Shizuoka-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 423 days.

(21) Appl. No.: 11/058,239

(22) Filed: Feb. 16, 2005

(65) Prior Publication Data

US 2005/0197791 A1   Sep. 8, 2005

(30) Foreign Application Priority Data

Feb. 25, 2004   (JP)   ............................. 2004-049936

(51) Int. Cl.
*H02M 3/335* (2006.01)
*G03G 15/02* (2006.01)

(52) U.S. Cl. .................. 363/21.18; 363/20; 363/21.01; 363/21.11; 363/97; 363/131

(58) Field of Classification Search ................. 363/20, 363/21.01, 21.11, 21.18, 95, 97, 131
See application file for complete search history.

(56) References Cited

U.S. PATENT DOCUMENTS

2002/0070786 A1* 6/2002 Yokota ........................ 327/330
2004/0239513 A1* 12/2004 Lomax et al. ............... 340/661

FOREIGN PATENT DOCUMENTS

| JP | 5-76173 | 3/1993 |
| JP | 09/093910 | 4/1997 |
| JP | 10-274901 | 10/1998 |
| JP | 11-327668 | 11/1999 |
| JP | 2004-004205 | 1/2004 |

* cited by examiner

*Primary Examiner*—Gary L Laxton
*Assistant Examiner*—Ramy Ramadan
(74) *Attorney, Agent, or Firm*—Fitzpatrick, Cella, Harper & Scinto

(57) ABSTRACT

A switching regulator has an input voltage detection circuit which inputs a voltage applied to a rectifier diode 7 connected in series with the secondary side of a transformer and generates a voltage signal Vvp corresponding to the voltage, and a calculation unit which calculates a voltage value Vin inputted to the primary side of the transformer based on a voltage value of the voltage signal generated by the input voltage detection circuit.

12 Claims, 15 Drawing Sheets

FIG. 3A  GATE VOLTAGE OF FET 6

FIG. 3B  ANODE VOLTAGE OF SECONDARY RECTIFIER DIODE 7

FIG. 3C  OUTPUT VOLTAGE OF VOLTAGE DETECTION CIRCUIT 27

F I G. 6A GATE VOLTAGE OF FET 6
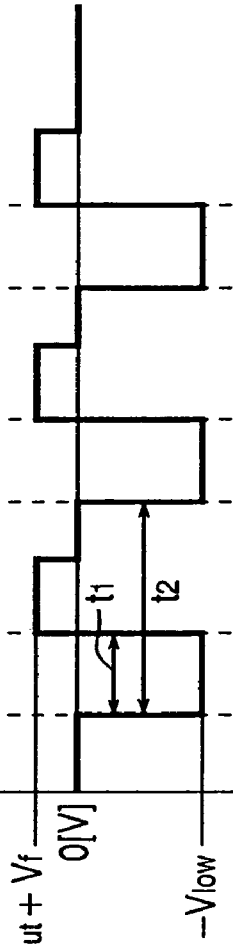
F I G. 6B ANODE VOLTAGE OF SECONDARY RECTIFIER DIODE 7
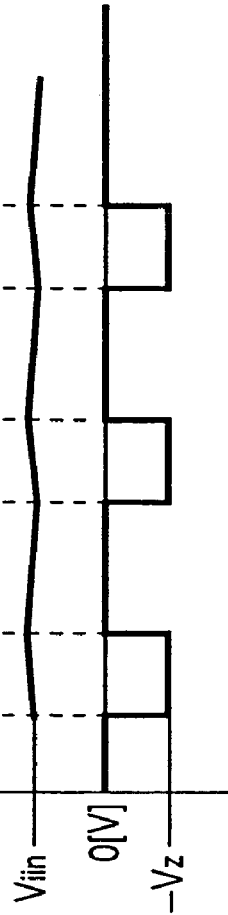
F I G. 6C OUTPUT VOLTAGE OF VOLTAGE DETECTION CIRCUIT 27

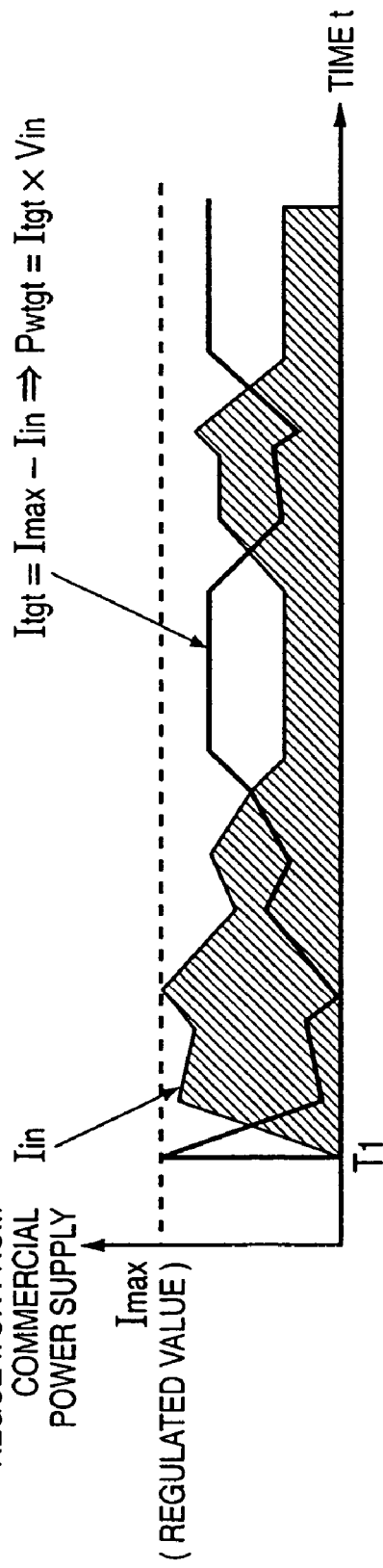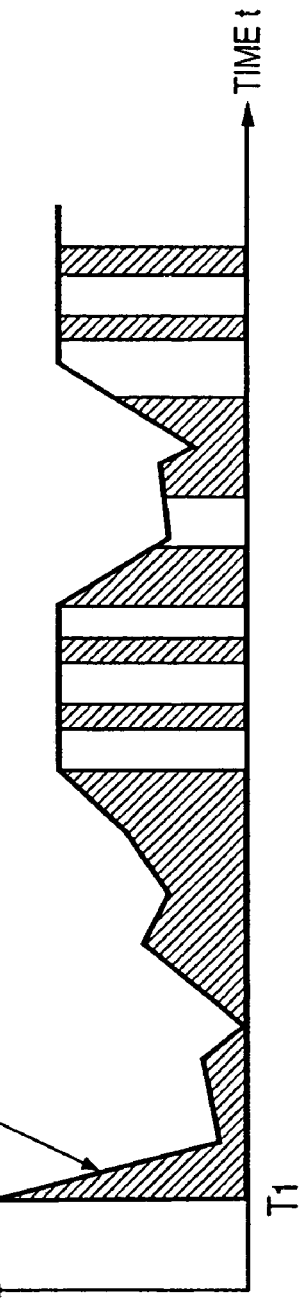

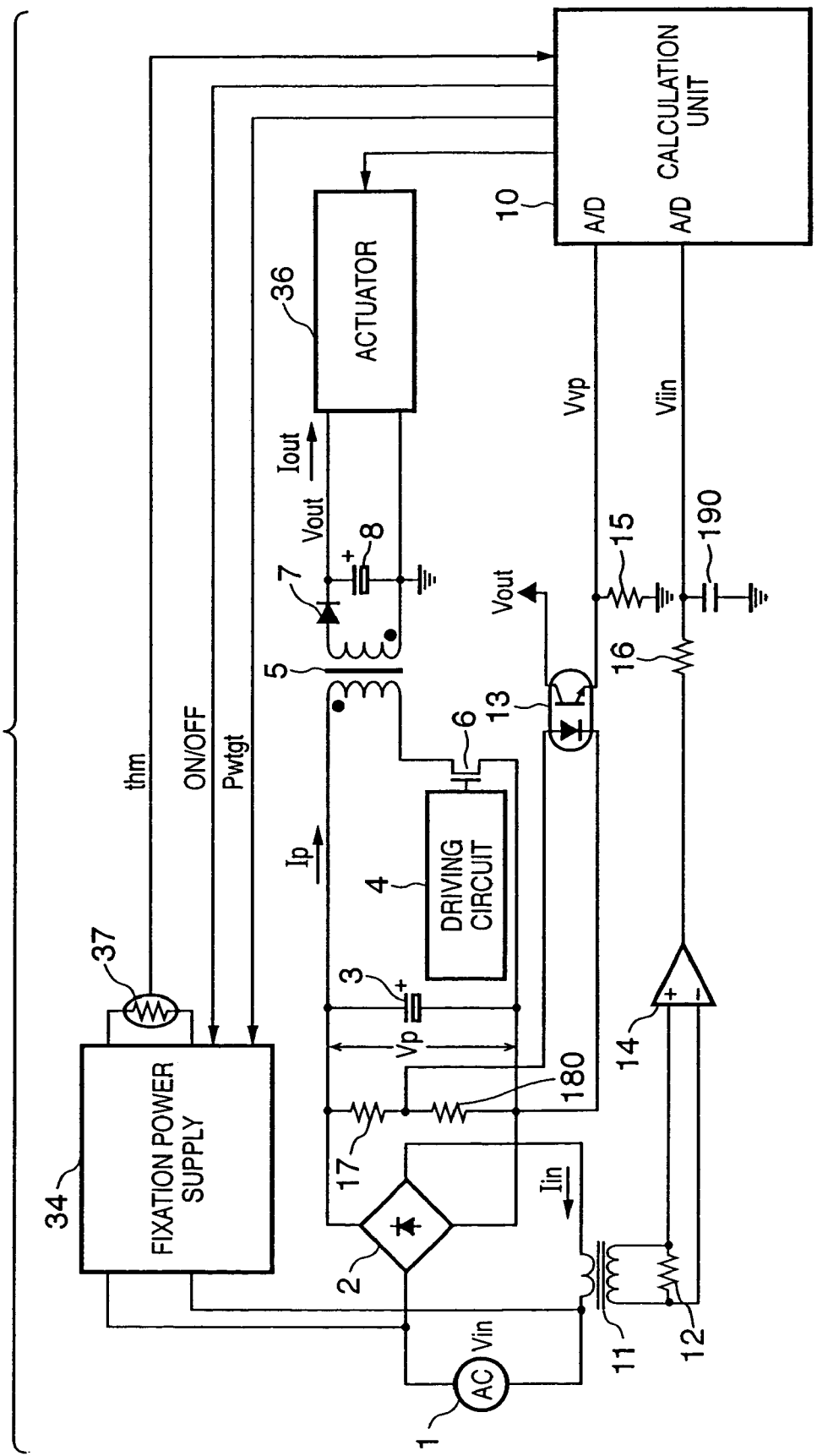

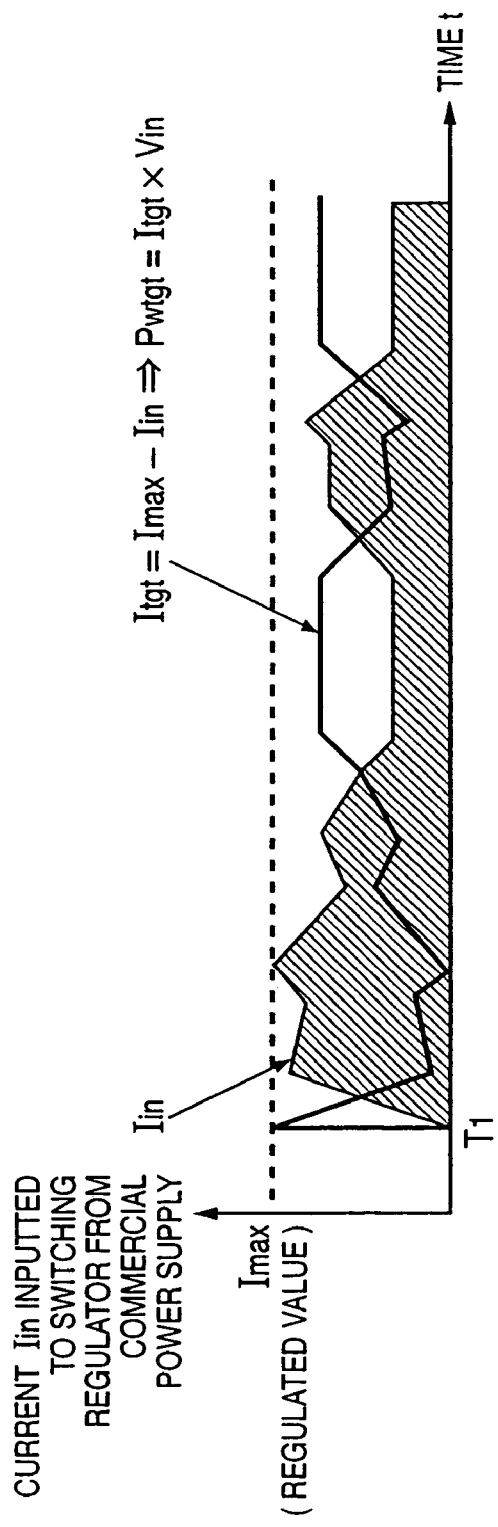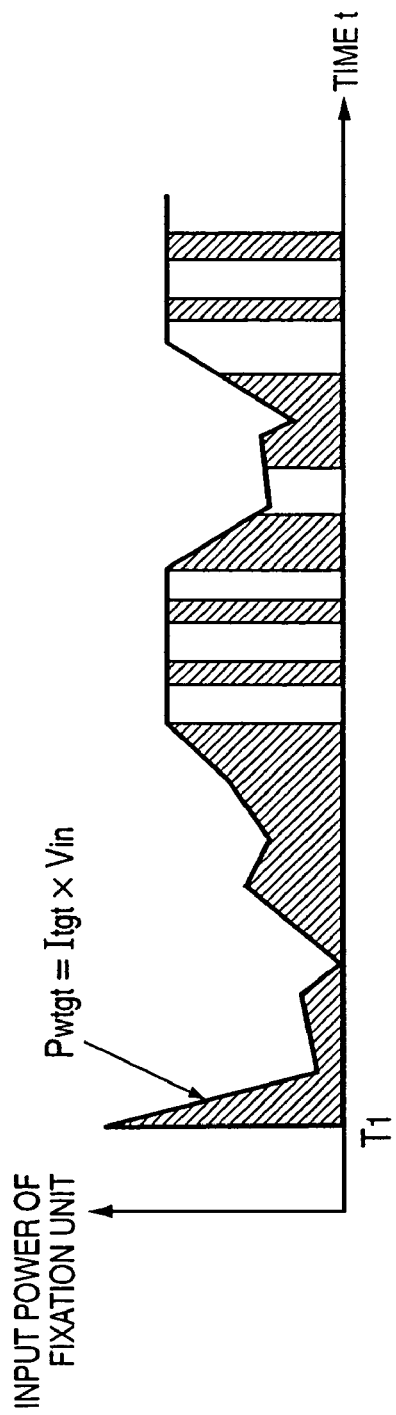

SWITCHING REGULATOR AND ITS CONTROL METHOD

FIELD OF THE INVENTION

The present invention relates to a switching regulator for rectifying, smoothing and switching a commercial power supply voltage and inputting the voltage to the primary side of a transformer, to generate a predetermined direct-current voltage on the secondary side of the transformer, and a control method for the switching regulator. Further, the invention relates to an image forming apparatus having the switching regulator and a control method for the apparatus.

BACKGROUND OF THE INVENTION

For protection of devices in a circuit of a switching regulator or operation control of a load on the secondary side, a voltage value of a commercial power supply and a current value inputted to the switching regulator, and a current value outputted from the switching regulator are detected. As a method for detecting the commercial power supply voltage value and the current value inputted to the switching regulator, a method using a photocoupler and a current transformer is proposed (See Japanese Patent Application Laid-Open No. Hei 10-274901).

The above conventional method will be described with reference to FIG. 11.

An alternating current supplied from a commercial power supply 1 is rectified and smoothed by a rectifier bridge 2 and a primary smoothing condenser 3, to an approximately constant voltage Vp. The voltage Vp is supplied via a transformer 5 to an FET 6. When switching of the FET 6 is caused by a driving circuit 4, a pulse voltage is induced on the secondary side of the transformer 5. The induced pulse voltage is rectified and smoothed by a secondary rectifier diode 7 and a secondary smoothing condenser 8, to a predetermined voltage Vout. The voltage Vout is supplied to a load 9.

Next, a method for detecting a voltage value of the commercial power supply 1 in the switching regulator will be described.

The primary voltage Vp is divided with resistors 17 and 180, and supplied to an LED of a photocoupler 13. As the amount of light emission from the LED of the photocoupler 13 is proportional to the voltage Vp, a photo transistor corrector current in the photocoupler 13 is also proportional to the voltage Vp. Accordingly, a voltage value Vvp supplied to a calculation unit 10 is proportional to the primary voltage value Vp. The calculation unit 10 obtains the primary voltage value Vp by inverse calculation from resistance values of the resistors 17 and 180 and a photo-electric current transfer ratio (CTR value) of the photocoupler 13, thereby obtains a voltage value Vin of the commercial power supply 1.

Next, a method for detecting a current value inputted to the switching regulator will be described.

A primary terminal of a current transformer 11 is connected to an input unit of the switching regulator. Accordingly, a current proportional to an input AC current value Iin flows in a secondary side terminal of the current transformer 11. The current is converted by a resistor 12 to a voltage, and supplied to a differential amplifier 14. An output voltage Viin from the differential amplifier 14 is smoothed by a resistor 16 and a condenser 190 and supplied to the calculation unit 10. The calculation unit 10 calculates a current value Iin inputted into the switching regulator by inverse operation from the ratio of winding of the current transformer 11 and the resistance value of the resistor 12, based on the voltage Viin.

Further, as a method for detecting a current value outputted from a switching regulator, use of current detection resistor is proposed (See Japanese Patent Application Laid-Open No. Hei 05-076173).

Next, a method for detecting a current value outputted from a switching regulator will be described with reference to FIG. 12.

A current detection resistor 340 is connected in series with an output of the switching regulator. A voltage Viout proportional to an output current Iout from the switching regulator occurs at between the both ends of the current detection resistor 340. The voltage Viout is detected by a differential amplifier 33, and supplied to the calculation unit 10. The calculation unit 10 converts the voltage Viout into a digital signal, and obtains an output current Iout outputted from the switching regulator by inverse operation (Viout/R) from a resistance value (R) of the current detection resistor 340.

Further, a control in a case where the switching regulator in FIG. 11 is incorporated in an image forming apparatus (e.g., a laser-beam printer) will be described with reference to FIG. 13.

In FIG. 13, the commercial power supply 1 is supplied to the switching regulator shown in FIG. 11 and a fixation power supply 34, and an actuator 36 in place of the load 9 in FIG. 11 is connected to the secondary side of the transformer 5.

The commercial power supply 1 is supplied to the above switching regulator and also supplied to the fixation power supply 34. An output from the fixation power supply 34 is supplied to a fixation unit 37. The fixation unit 37 melts a toner image and fixes the image to the surface of print sheet. The calculation unit 10 turns on/off output power from the fixation power supply 34 to the fixation unit 37, based on a temperature information signal thm supplied from a temperature detection unit (not shown) provided in the fixation unit 37, such that the fixation unit 37 has an approximately constant temperature. At this time, the timing of on/off in the fixation power supply 34 is regulated by an on/off timing signal (ON/OFF) supplied from the calculation unit 10 to the fixation power supply 34. Further, the output power from the fixation power supply 34 is regulated by a power upper limit signal Pwtgt.

Generally, a current value consumable by an electrical equipment from the commercial power supply 1 is regulated with a maximum current value Imax by the safety standard. For example, in Japan, the current value consumable by electrical equipment from a commercial outlet is up to 15A. Accordingly, the calculation unit 10 sequentially calculates the power upper limit signal Pwtgt such that the current inputted to the image forming apparatus from the commercial power supply 1 does not exceed the regulated current value Imax, and controls the power supplied to the fixation unit 37. This operation will be described with reference to FIGS. 14A and 14B.

FIG. 14A depicts the transition of the current Iin inputted into the switching regulator. At timing T1, when the main switch (not shown) of the image forming apparatus is turned on, the calculation unit 10 appropriately operates the actuator 36 in preparation for image forming operation. In accordance with this operation, the current Iin inputted to the switching regulator increases. The calculation unit 10 sequentially detects the input current value Iin and calculates the difference from the regulated current value Imax, Itgt=Imax−Iin. That is, the difference Itgt is a current value allowable to the fixation unit 37. Further, the calculation unit 10 detects the input voltage Vin, and calculates power allowable to the fixation unit 37, Pwtgt=Itgt×Vin from the current value Itgt and the input voltage Vin.

As shown in FIG. 14B, the calculation unit 10 on/off controls the power Pwtgt inputted into the fixation unit 37 such that the temperature of the fixation unit 37 is approximately constant. In this arrangement, the current inputted to the image forming apparatus from the commercial power supply 1 is controlled not to exceed the regulated current value Imax.

However, the above-described conventional art has following problems. First, for detection of the voltage value and current value of the commercial power supply 1 inputted into the switching regulator, primary-secondary insulating parts such as the photocoupler 13 and the current transformer 11 are required, and the cost is increased. Secondly, when the current value outputted from the switching regulator is detected, as the current detection resistor 340 is inserted in an output power supply line, electric power loss is caused in the current detection resistor 340. Thirdly, the voltage drop caused in the current detection resistor 340 degrades accuracy of output voltage from the switching regulator.

Lastly, in a case where this conventional switching regulator is incorporated in an image forming apparatus, the primary-secondary insulating parts such as the photocoupler 13 and the current transformer 11 are required and the cost is increased. To observe the regulated current value of commercial power supply without such photocoupler and current transformer, proposed is an image forming apparatus in which a maximum current value consumed by the actuator 36, Iamax, is stored in the calculation unit 10 and power, up to (Imax−Iamax)×Vinmin (Vinmin is a minimum value of commercial power supply voltage), is supplied to the fixation unit 37. However, in this construction, when the current consumed by the actuator 36 is less than Iamax or when the commercial power supply voltage is higher than Vinmin, a current which can be sufficiently supplied from the commercial power supply 1 cannot be efficiently used. This construction increases time from power-on of the main switch before the temperature of the fixation unit 37 has increased to a temperature for image forming operation (warming up time).

SUMMARY OF THE INVENTION

The present invention has been made in consideration of the above problems, and one of its features is to address the drawbacks of the above-described conventional art.

Further, another feature of the present invention is to provide a switching regulator and image forming apparatus and its control method for detecting a current outputted from a switching regulator while suppressing power loss and degradation of output voltage accuracy.

According to the present invention, there is provided with a switching regulator comprising:

voltage waveform detection means for inputting a voltage applied to a rectifier diode connected in series with a secondary side of a transformer and generating a voltage signal corresponding to the voltage; and control means for calculating a voltage value inputted into a primary side of the transformer, based on a voltage value of the voltage signal generated by the voltage waveform detection means.

Further, according to the present invention, there is provided with an image forming apparatus for image formation based on an electrophotographic method, comprising:

a fixation unit configured to fix a toner image formed on a recording medium by heat;

a fixation power supply-configured to supply electric power to the fixation unit;

an actuator configured to perform an image forming operation;

a switching regulator configured to supply electric power to the actuator;

calculation means for obtaining a current value inputted to the switching regulator; and power control means for controlling power supply by the fixation power supply in correspondence with the current value obtained by the calculation means.

The above features are attained by the combination of features described in the main claim, and the sub claims merely define particular examples of the present invention.

As the summary of the invention does not give all the necessary features, sub-combination of these features can be regarded as the invention.

Other features, objects and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 6A to 6C are signal waveform diagrams showing the operations of the switching regulator and the input current detection circuit according to the second embodiment;

FIGS. 10A and 10B are waveform diagrams showing the operation of the image forming apparatus according to the fourth embodiment;

FIG. 13 is a block diagram showing the construction around the power supply in the conventional image forming apparatus;

FIGS. 14A and 14B are waveform diagrams sowing power supply control by the fixation unit in the conventional image forming apparatus.

DETAILED DESCRIPTION OF THE PREFERRED EMBODIMENTS

Preferred embodiments of the present invention will now be described in detail in accordance with the accompanying drawings. Note that the following embodiments do not limit the invention recited in the claims, further, all the combinations of features described in the embodiments are not essential to the solution by the present invention.

First Embodiment

Figure 1:
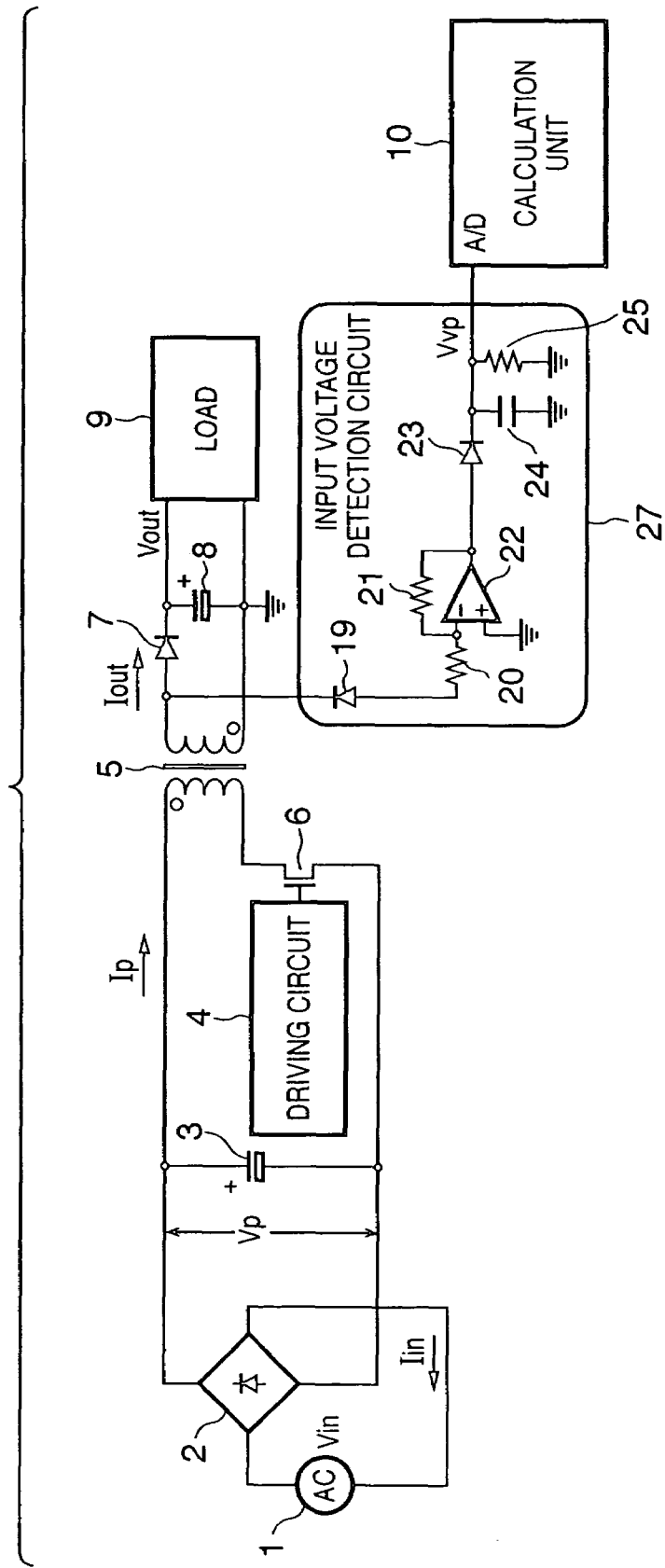
FIG. 1 is a block diagram showing the constructions of a switching regulator and an input voltage detection circuit according to a first embodiment of the present invention.

FIG. 1 is a block diagram showing the constructions of a switching regulator and an input voltage detection circuit according to a first embodiment of the present invention. In the present embodiment, the switching regulator is applied to a fly-back type power supply having a fixed oscillation frequency. The characteristic feature of the present embodiment is that an anode voltage waveform of a secondary rectifier diode 7 is monitored, and a voltage value of a commercial power supply is detected from a negative peak value of the voltage waveform.

An alternating voltage supplied from a commercial power supply 1 is rectified and smoothed by a rectifier bridge 2 and a primary smoothing condenser 3, to an approximately constant voltage Vp. The voltage Vp is supplied via a transformer 5 to an FET 6. When switching is caused in the FET 6 by driving of a driving circuit 4, a pulse voltage is induced on the secondary side of the transformer 5. The induced pulse voltage is rectified and smoothed by a secondary rectifier diode 7 and a secondary smoothing condenser 8, to a predetermined voltage Vout. The voltage Vout is supplied to a load 9.

An input voltage detection circuit 27 is connected to an anode terminal of the secondary rectifier diode 7. Hereinbelow, the operation of the input voltage detection circuit 27 will be described with reference to FIGS. 2 and 3.

The input voltage detection circuit 27 includes a diode 19, an inverting amplifier circuit (resistors 20, 21 and an operational amplifier 22), a peak hold circuit (a diode 23, a condenser 24, a resistor 25).

Figure 2:
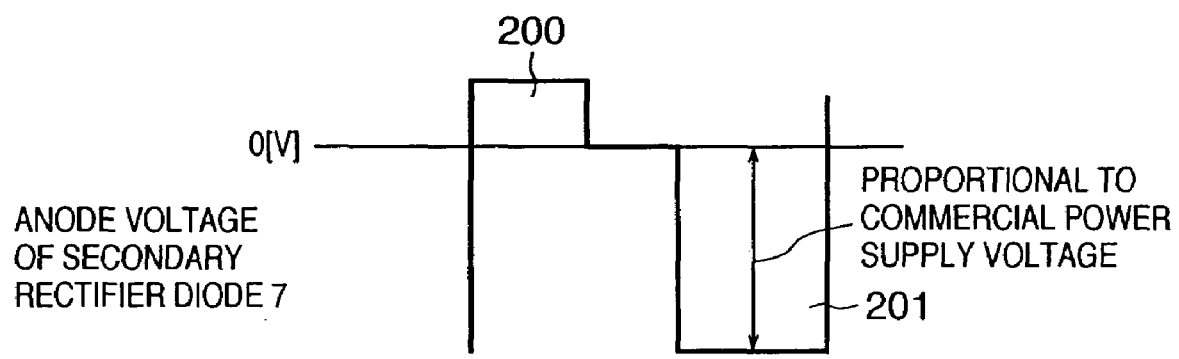
FIG. 2 is a waveform diagram showing an anode voltage of a secondary rectifier diode according to the first embodiment.
Figure 3:
FIGS. 3A to 3C are signal waveform diagrams showing the operations of the switching regulator and the input voltage detection circuit according to the first embodiment.

FIG. 2 is a waveform diagram showing voltage changes of the anode terminal of the secondary rectifier diode 7.

In FIG. 2, reference numeral 200 indicates a waveform of the anode voltage when the FET 6 is off, and numeral 201 denotes a waveform of the anode voltage 13. when the FET 6 is on.

FIGS. 3A to 3C depict signal waveform diagrams showing voltage changes of the anode terminal of the secondary rectifier diode 7 and output voltage changes of the input voltage detection circuit 27 in correspondence with the on/off status of the FET 6.

FIG. 3A depicts a gate voltage of the FET 6 driven by the driving circuit 4. When the gate voltage is at a high level, the FET 6 is turned on.

FIG. 3B depicts a voltage waveform of the anode terminal of the secondary rectifier diode 7 which changes in correspondence with the gate voltage of the FET 6 in FIG. 3A. The waveform has an amplitude from (−Vlow) to (Vout+Vf). The voltage Vf is a forward voltage of the secondary rectifier diode 7. The waveform of the anode voltage is sliced to only a negative voltage portion by the diode 19, and inputted into the inverting amplifier circuit including the operational amplifier 22.

FIG. 3C depicts an output of the inverting amplifier circuit as a pulse waveform indicated with a broken line. At this time, assuming that the gain of the inverting amplifier circuit is α, a high-level voltage Vvp of the pulse wave is expressed as follows.

$$Vvp = \alpha Vlow \quad (1)$$

Further, the voltage Vlow is expressed as follows, using the terminal voltage Vp of the primary electrolytic condenser 3, the number of windings N1 on the primary side of the transformer 5 and the number of windings N2 on the secondary side of the transformer 5.

$$Vlow = Vp \times N2/N1 \quad (2)$$

Further, the following expression (3) is established between the effective value Vin of the voltage (sine wave voltage) of the commercial power supply 1 and the terminal voltage Vp of the primary electrolytic condenser 3.

$$Vp = \sqrt{2} \times Vin \quad (3)$$

Accordingly, the following expressions (4) and (5) are established.

$$Vvp = \sqrt{2} \times \alpha Vin \times N2/N1 \quad (4)$$

$$Vin = N1 \times Vvp/\sqrt{2} \times \alpha N2 \quad (5)$$

That is, the effective value Vin of the voltage of the commercial power supply 1 is proportional to the high-level voltage Vvp of the inverting amplifier circuit. The output pulse from the inverting amplifier circuit is converted by a peak hold circuit to be described later to an approximate Vvp direct-current voltage as shown in FIG. 3C, and is inputted into an A/D conversion port of the calculation unit 10. The calculation unit 10 obtains the voltage Vin of the commercial power supply by using the above expression (5) from the gain a of the inverting amplifier circuit, the number of windings N1 on the primary-side of the transformer 5 and the number of windings N2 on the secondary side of the transformer 5, and the output voltage value Vvp (α, N1 and N2 are designated in advance).

Note that the constructions of the switching regulator, the input voltage detection circuit and the like described in the first embodiment can be arbitrarily changed and do not pose any limitation on the present invention.

As described above, according to the first embodiment, primary-secondary insulating parts such as photocoupler and current transformer required in the conventional art can be omitted. Further, in a case where a current value and a voltage value outputted from the switching regulator are detected, since it is not necessary to insert a current detection resistor which causes electric power loss in an output power supply line, an input voltage value and an input current value can be obtained with high accuracy without electric power loss.

Second Embodiment

Figure 4:
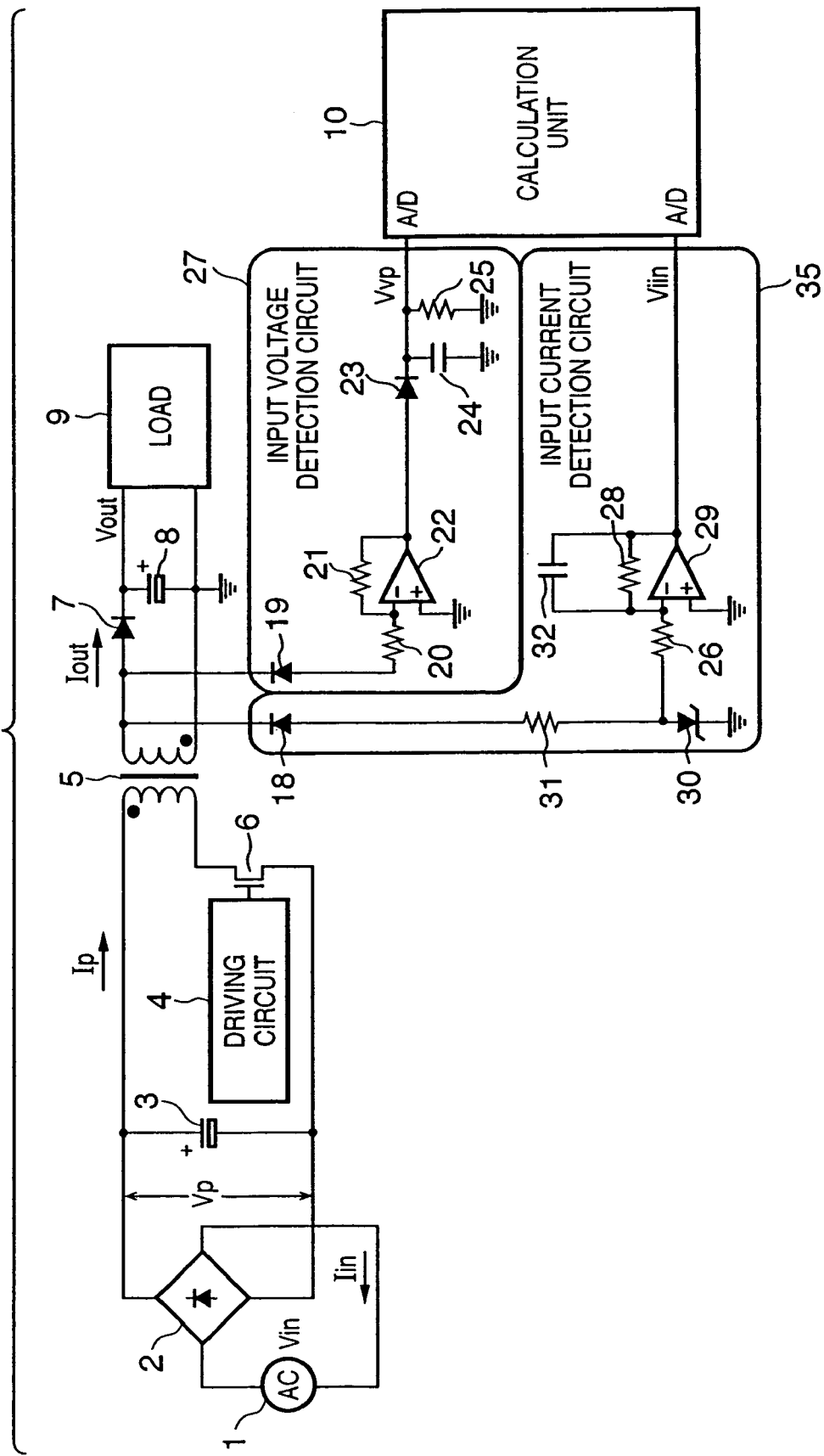
FIG. 4 is a block diagram showing the constructions of the switching regulator, the input voltage detection circuit and an input current detection circuit according to a second embodiment of the present invention.

FIG. 4 is a block diagram showing the switching regulator according to a second embodiment of the present invention. In FIG. 4, elements corresponding to those in FIG. 1 have the same reference numerals and the explanations thereof will be omitted. In the second embodiment, the switching regulator is applied to a fly-back type power supply having a fixed oscillation frequency. As in the case of the above first embodiment, an input voltage value from the commercial power supply 1 is detected, the anode voltage waveform of the secondary rectifier diode 7 is monitored, and a current value inputted into the switching regulator is detected from a negative pulse width.

Hereinbelow, the operation of an input current detection circuit 35 will be described with reference to FIGS. 4 and 5, and FIGS. 6A to 6C. Note that in FIG. 4, as other operations than the operation of the input current detection circuit 35 are similar to those in the first embodiment, the explanations thereof will be omitted.

The input current detection circuit 35 has a diode 18 and an integrating circuit (a zener diode 30, resistors 26, 28 and 31, a condenser 32 and an operational amplifier 29).

Figure 5:
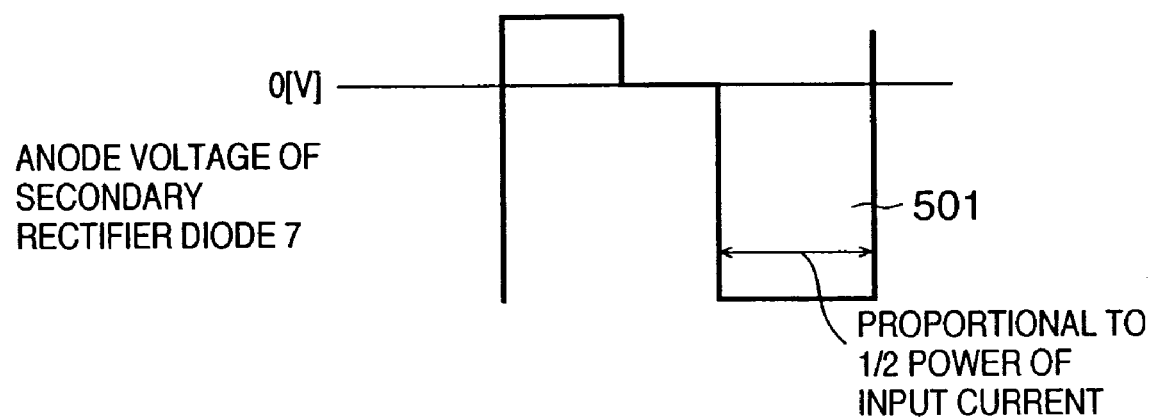
FIG. 5 is a waveform diagram showing the anode voltage of the secondary rectifier diode according to the second embodiment of the present invention.

FIG. 5 is a waveform diagram showing the anode voltage of the secondary rectifier diode 7 according to the second embodiment of the present invention. As in the case of the above-described FIG. 2. In a waveform 501 of the anode voltage when the FET 6 is on, the pulse width is proportional to ½ power of the input current.

FIG. 6A depicts a gate voltage of the FET 6 driven by the driving circuit 4. When the gate voltage is at a high level, the FET 6 is turned on.

FIG. 6B depicts a waveform of the anode voltage of the secondary rectifier diode 7, having an amplitude (−Vlow) to (Vout+Vf). The voltage is sliced to only a negative voltage portion by the diode 18, and clamped by the zener diode 30 to a voltage (−Vz). Accordingly, as shown in FIG. 6C, the input voltage of the integrating circuit including the operational amplifier 29 has a pulse waveform with an amplitude 0[V] to (−Vz).

In this waveform, assuming that a negative pulse width is t1, the period is t2, and the gain of the integrating circuit is β, an output voltage Viin from the integrating circuit is expressed as follows.

$$Viin = \beta Vz \cdot t1/t2 \quad (6)$$

Accordingly, the negative pulse width t1 is expressed as follows.

$$t1 = t2 \times Viin/\beta \times Vz \quad (7)$$

An input current Iin to the fly-back power supply is expressed, by using the pulse width t1, the commercial power supply voltage Vin, and primary inductance L1 of the transformer 5, as follows.

$$Iin = \sqrt{2} Vin \times t1^2 / 2t2 \times L1 \quad (8)$$

Accordingly, the input current Iin is expressed as follows.

$$Iin = \sqrt{2} Vin \times t2 \times Viin^2 / 2L1 \times \beta^2 Vz^2 \quad (9)$$

That is, the input current Iin from the commercial power supply 1 is proportional to the 2nd power ($Viin^2$) of the output voltage Viin of the integrating circuit.

The output voltage Viin is inputted into the A/D conversion port of the calculation unit 10. The calculation unit 10 obtains the input current Iin by the above-described expression (9) from the A/D-converted output voltage Viin of the integrating circuit, the above-described commercial power supply voltage Vin, and the other constants (t2, L1, β and Vz are designated in advance).

Note that the constructions of the switching regulator, the input voltage detection circuit and the input current detection circuit can be arbitrarily changed, and do not pose any limitation on the present invention.

As described above, according to the second embodiment, primary-secondary insulating parts such as photocoupler and current transformer required in the conventional art can be omitted. Further, in a case where a current value and a voltage value outputted from the switching regulator is detected, since it is not necessary to insert a current detection resistor which causes electric power loss in an output power supply line, an input voltage and an input current value can be obtained with high accuracy without electric power loss.

Third Embodiment

Figure 7:
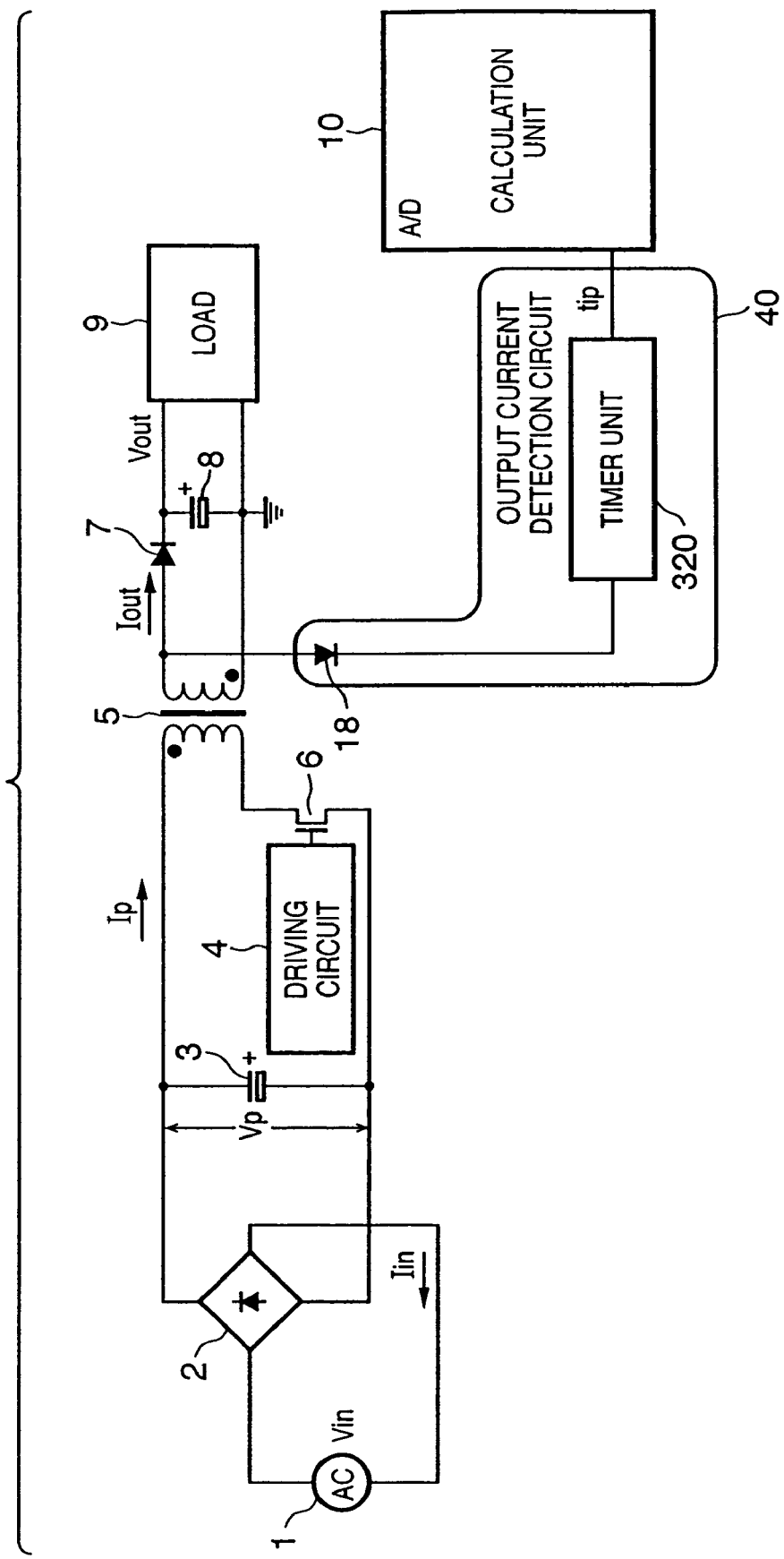
FIG. 7 is a block diagram showing the constructions of the switching regulator, and an output current detection circuit according to a third embodiment of the present invention.

FIG. 7 is a block diagram showing the constructions of the switching regulator according to a third embodiment of the present invention. In FIG. 7, elements corresponding to those in FIG. 1 have the same reference numerals, and the explanations thereof will be omitted. In the third embodiment, the switching regulator is applied to a fly-back type power supply having a fixed oscillation frequency. The characteristic feature of the present embodiment is that the anode voltage waveform of secondary rectifier diode 7 is monitored, and a current value Iout from the switching regulator is detected from a pulse width when the anode voltage is positive.

Hereinbelow, the operation of an output current detection circuit 40 will be described with reference to FIG. 8. Since other elements than the output current detection circuit 40 are the same as those of the above-described first embodiment, the explanations thereof will be omitted.

The output current detection circuit 40 has a timer unit 320. The timer unit 320 monitors the waveform of the anode voltage of the secondary rectifier diode 7, and output time t3 of pulse width when the anode voltage is positive to the calculation unit 10. Note that the time measurement operation by the timer unit 320 may be performed by the calculation unit 10.

Figure 8:
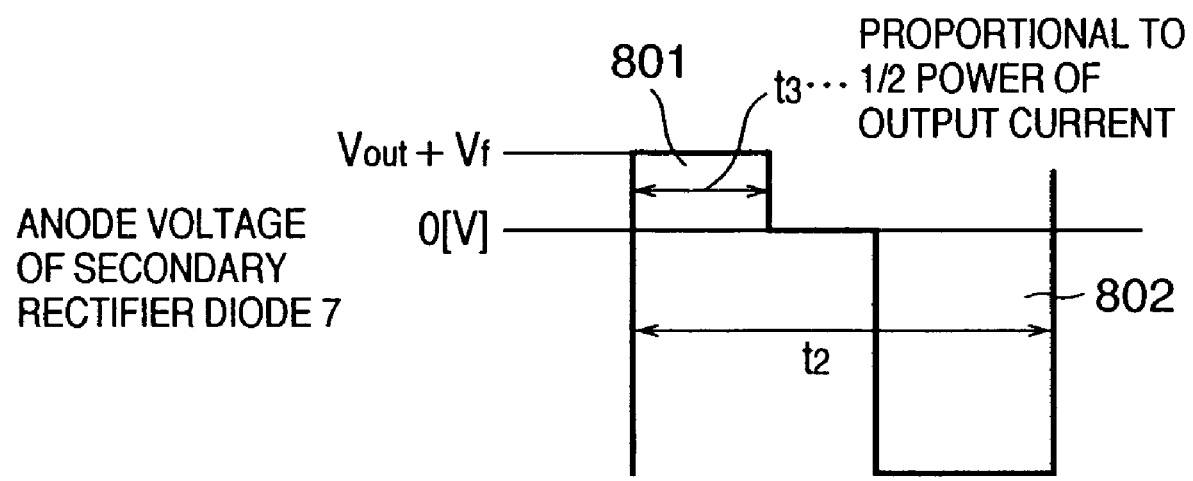
FIG. 8 is a waveform diagram showing the anode voltage of the secondary rectifier diode according to the third embodiment of the present invention.

FIG. 8 is a waveform diagram showing the anode voltage of the secondary rectifier diode 7 corresponding to the output from the fly-back type power supply. In FIG. 8, numeral 801 indicates a state where the anode voltage is positive, and numeral 802 denotes a state where the anode voltage is negative.

The output current Iout is expressed, by using the time t3 where the anode voltage is positive, a switching period t2, secondary inductance L2 of the transformer 5, the output voltage Vout and the forward voltage Vf of the secondary rectifier diode, as follows.

$$Iout = (Vout + Vf) \times t3^2 / 2L2 \times t2 \quad (10)$$

That is, the output current Iout is proportional to the 2nd power ($t3^2$) of the time t3 where the anode voltage is positive. Accordingly, the calculation unit 10 obtains the output current Iout by the expression (10) from the time t3 and the other constants (t2, L2, Vout and Vf).

Note that the constructions of the switching regulator and the output current detection circuit can be arbitrarily changed, and do not pose any limitation on the present invention.

As described above, according to the third embodiment, primary-secondary insulating parts such as photocoupler and current transformer required in the conventional art can be omitted. Further, in a case where a current value and a voltage value outputted from the switching regulator is detected, since it is not necessary to insert a current detection resistor which causes electric power loss in an output power supply line, an input voltage and an input current value can be obtained with high accuracy without electric power loss.

Fourth Embodiment

Figure 9:
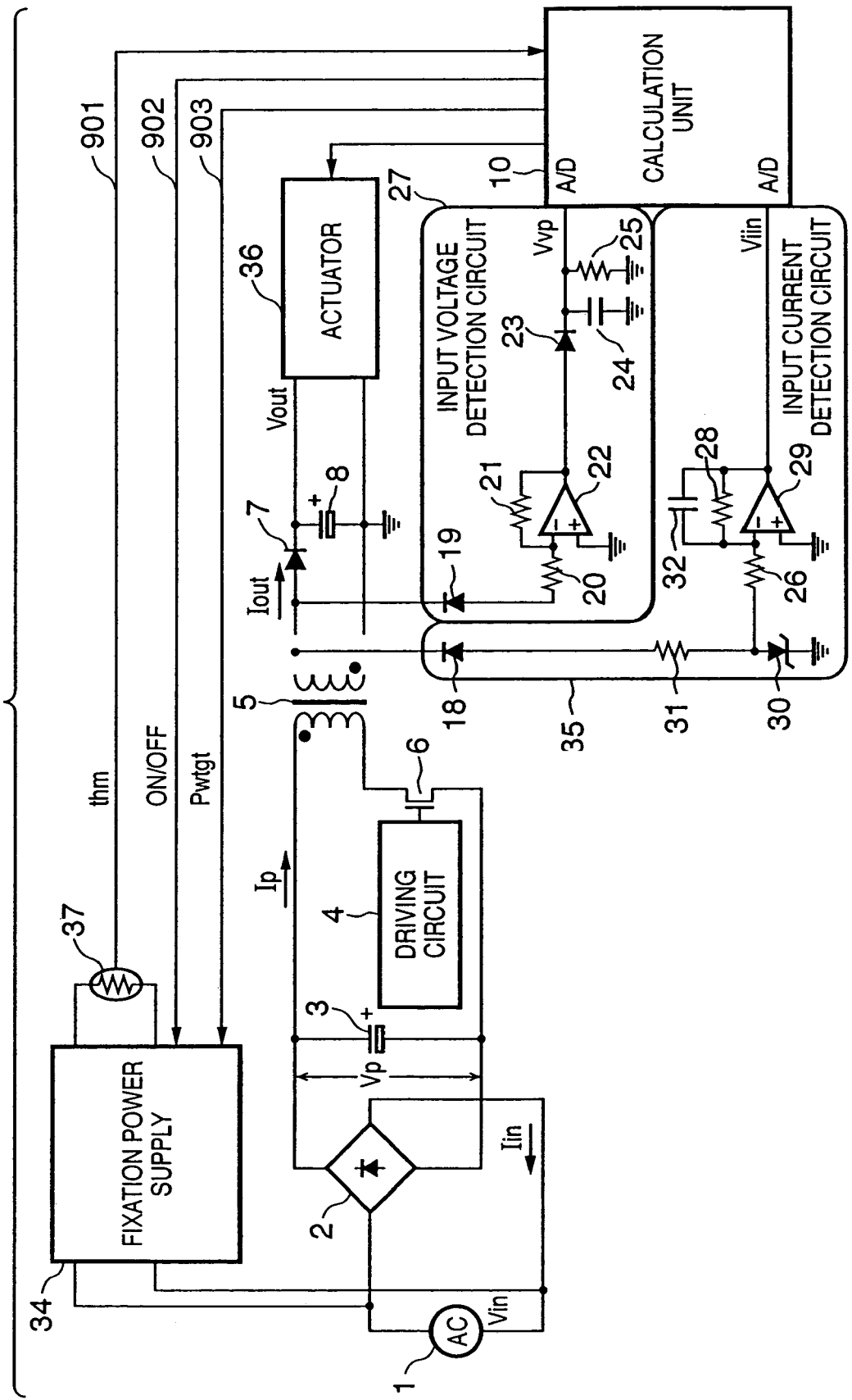
FIG. 9 is a block diagram showing the construction around a power supply in an image forming apparatus according to a fourth embodiment of the present invention.
Figure 11:
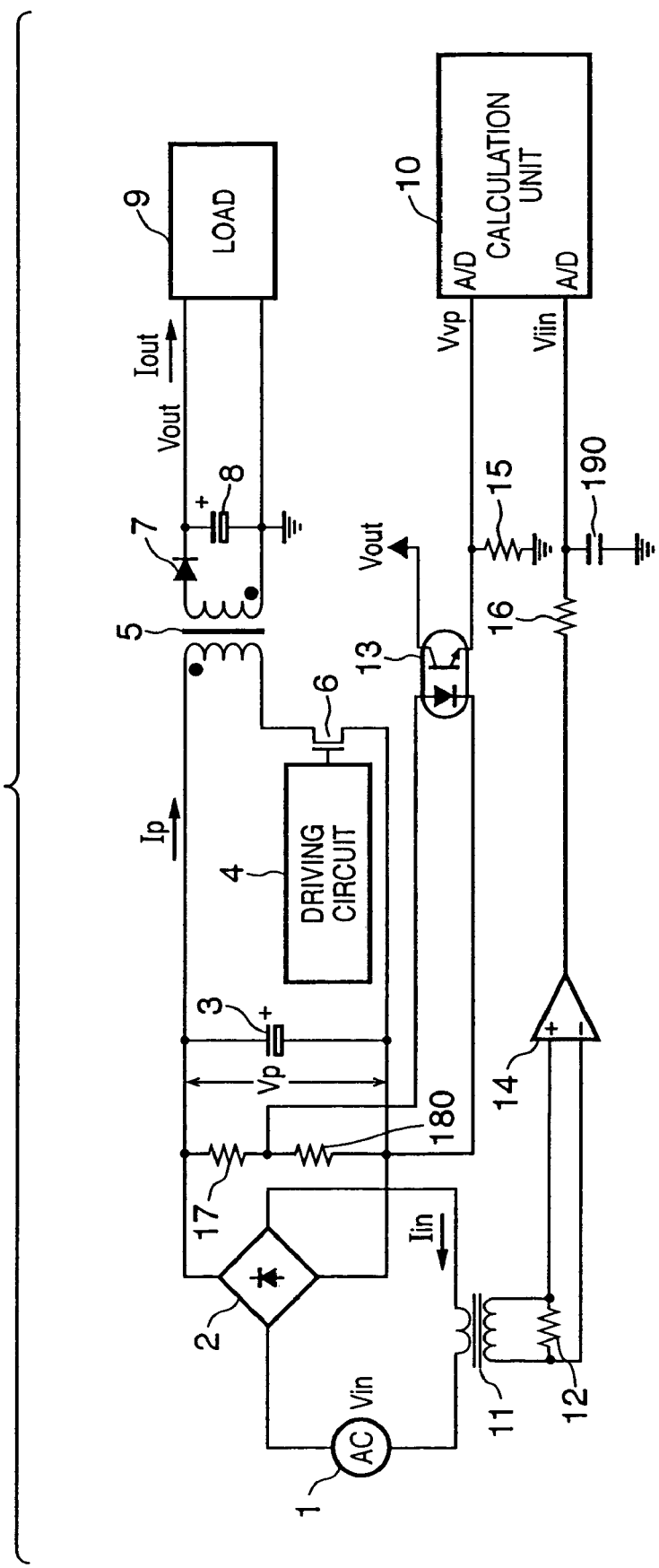
FIG. 11 is a block diagram showing the construction around the power supply in the conventional image forming apparatus.
Figure 12:
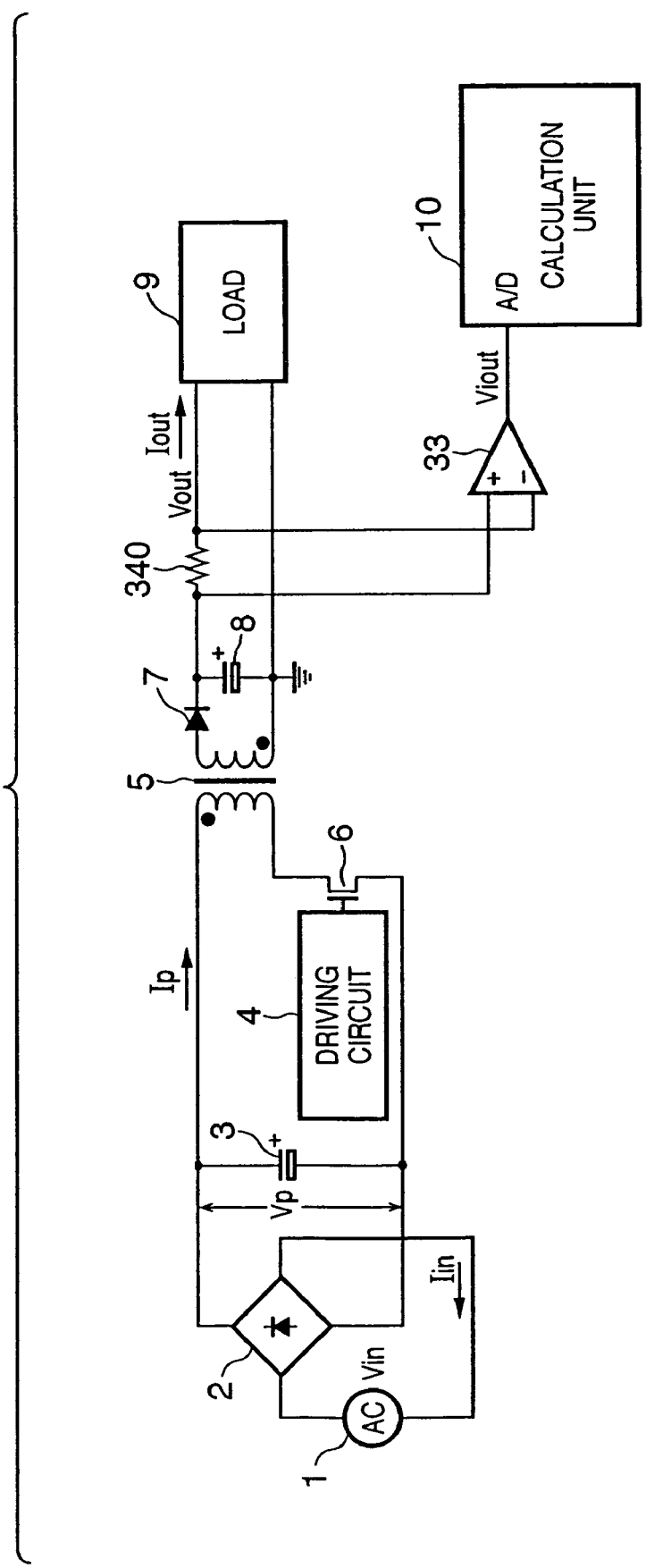
FIG. 12 is a block diagram showing the construction around the power supply in the conventional image forming apparatus.

FIG. 9 is a block diagram showing an image forming apparatus according to a fourth embodiment of the present invention. In the fourth embodiment, the switching regulator described in the above second embodiment (FIG. 4) is used as a power supply for an actuator for the image forming apparatus. A method for controlling a fixation unit of the image forming apparatus based on a commercial power supply voltage value and an input current value detected by the switching regulator will be described. Note that the methods for detecting the commercial power supply voltage value Vin and the input current value Iin to the switching regulator by the switching regulator are the same as those described in the first and second embodiments, therefore, the explanations thereof will be omitted.

The output voltage Vout from the switching regulator is supplied to the actuator 36. The actuator 36 performs an image forming operation based on the control by the calculation unit 10. The commercial power supply 1 is supplied to the switching regulator, and is also supplied to the fixation power supply 34. An output from the fixation power supply 34 is supplied to the fixation unit 37. The fixation unit 37 melts a toner image and fixes the image to the surface of print sheet. The calculation unit 10 turns on/off the output power from the fixation power supply 34 to the fixation unit 37, based on a temperature information signal thm 901 supplied from a temperature detection unit (not shown) provided in the fixation unit 37, such that the fixation unit 37 has an approximately constant temperature. At this time, the timing of on/off in the fixation power supply 34 is regulated by an on/off timing signal 902 supplied from the calculation unit 10 to the fixation power supply 34. Further, the output power from the fixation power supply 34 is regulated by a power upper limit signal Pwtgt 903.

Generally, a current value consumable by an electrical equipment from the commercial power supply 1 is regulated with a maximum current value Imax by the safety standard. For example, in Japan, the current value consumable by electrical equipment from a commercial outlet is up to 15A.

Accordingly, the calculation unit 10 sequentially calculates the power upper limit signal Pwtgt such that the current inputted to the image forming apparatus from the commercial power supply 1 does not exceed the regulated current value Imax, and controls the power supplied to the fixation unit 37.

This operation will be described with reference to FIGS. 10A and 10B.

FIG. 10A depicts the transition of the current Iin inputted into the switching regulator. At timing T1, when the main switch (not shown) of the image forming apparatus is turned on, the calculation unit 10 appropriately operates the actuator 36 in preparation for image forming operation. In accordance with this operation, the current Iin inputted to the switching regulator sequentially changes. The calculation unit 10 sequentially detects the input current value Iin (second embodiment) and calculates the difference from the regulated current value Imax, Itgt (=Imax−Iin). That is, the difference Itgt is a current value allowable to the fixation unit 37. Further, the calculation unit 10 detects the input voltage Vin (first embodiment), and calculates electric power allowable to the fixation unit 37, Pwtgt (Pwtgt=Itgt×Vin) from the current value Itgt and the input voltage Vin.

As shown in FIG. 10B, the calculation unit 10 on/off controls the power Pwtgt 903 inputted into the fixation power supply 34 such that the temperature of the fixation unit 37 is approximately constant. In this arrangement, the current inputted to the image forming apparatus from the commercial power supply 1 is controlled not to exceed the regulated current value Imax.

According to the fourth embodiment, as a current inputted to the switching regulator for an actuator and a commercial power supply voltage inputted to the image forming apparatus are sequentially detected without primary-second insulating parts such as photocoupler and current transformer required in the conventional art. Further, as the current available from the commercial power supply is not wasted, the time from the power-on of the main switch before the temperature of the fixation unit 37 has increased to a temperature for image forming operation (warming up time) can be reduced.

Figure 15:
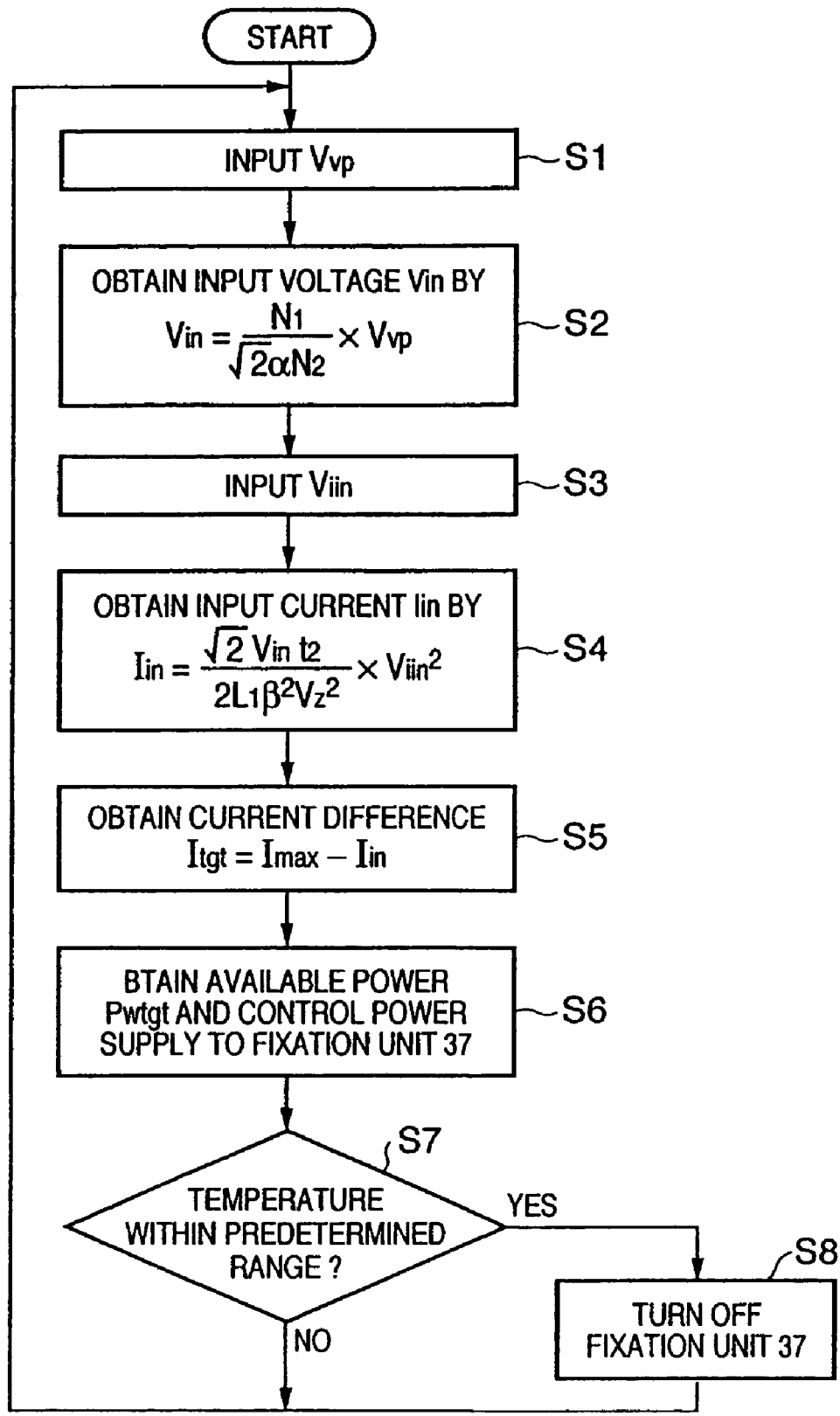
FIG. 15 is a flowchart showing power supply control by a fixation unit in the image forming apparatus according to the fourth embodiment.

FIG. 15 is a flowchart showing control processing by the calculation unit 10 to control the fixation unit 37 in the image forming apparatus according to the fourth embodiment. A program for execution of the processing is stored in a program memory (not shown) in the calculation unit 10.

This processing is started when, e.g., the power of the apparatus is turned on. First, at step S1, the voltage value Vvp outputted from the input voltage detection circuit 27 is inputted, then the input voltage Vin is calculated based on the above-described expression (5) (step S2). Next, at step S3, the voltage value Viin outputted from the input current detection circuit 35 is inputted, then the input current Iin is calculated based on the above-described expression (9) (step S4). Then at step S5, the current difference from the regulated current value Imax, Itgt (=Imax−Iin), is calculated, then at step S6, the electric power Pwtgt (=Itgt×Vin) available to the fixation unit 37 is calculated. The fixation power supply 34 is controlled based on the available power Pwtgt, to control electric power supplied to the fixation unit 37. Next, at step S7, it is determined whether or not the temperature of the fixation unit 37 is within a predetermined range. If temperature is within the predetermined range (if sufficiently heated), the process proceeds to step S8, at which electric power supply to the fixation unit 37 is stopped and returns to step S1.

On the other hand, if the temperature of the fixation unit 37 has not become within the predetermined range, the process returns to step S1, to repeatedly perform the above-described processing.

The present invention is not limited to the above embodiments and various changes and modifications can be made within the spirit and scope of the present invention. Therefore, to appraise the public of the scope of the present invention, the following claims are made.

CLAIM OF PRIORITY

This patent application claims priority from Japanese Patent Application No. 2004-49936 filed on Feb. 25, 2004, which is hereby incorporated by reference.

What is claimed is:

1. A switching regulator comprising:
    a voltage waveform detector configured to input a voltage applied to a rectifier diode connected in series with a secondary side of a transformer and generate a first voltage signal corresponding to the voltage;
    a first controller configured to calculate a voltage value inputted into a primary side of the transformer, based on a voltage value of the first voltage signal generated by said voltage waveform detector;
    a clamp circuit configured to clamp the voltage applied to the rectifier diode connected in series with the secondary side of the transformer;
    an integrating circuit configured to input and integrate a second voltage signal clamped by said clamp circuit; and
    a second controller configured to calculate a current value inputted to the primary side of the transformer, based on the voltage value inputted to the primary side of the transformer and a period of the second voltage signal integrated by said integrating circuit.

2. The switching regulator according to claim 1, wherein said voltage waveform detector comprises:
    an amplifier circuit configured to amplify the voltage applied to the rectifier diode; and
    a holding circuit configured to hold an output from the amplifier circuit.

3. The switching regulator according to claim 2, wherein the voltage value of the first voltage signal is Vvp and the voltage value inputted to the primary side of the transformer is Vin, said first controller calculates the voltage value Vin by
    $Vin = N1 \times Vvp/\sqrt{2} \times \alpha N2$, wherein N1 is the number of windings of the primary side of the transformer, N2 is the number of windings of the secondary side of the transformer, and $\alpha$ is the gain of the amplifier circuit.

4. The switching regulator according to claim 1, wherein, the current value inputted to the primary side of the transformer is Iin, the voltage value inputted to the primary side of the transformer is Vin, and the voltage value of the second voltage signal integrated by the integrating circuit is Viin, and a clamp voltage value by the clamp circuit is Vz, said second controller calculates the current value Iin by
    $Iin = \sqrt{2} Vin \times t2 \times Viin^2 / 2L1 \times \beta^2 Vz^2$, wherein L1 is primary inductance of the transformer, $\beta$ is the gain of the integrating circuit, and t2 is the period of the second voltage signal.

5. The switching regulator according to claim 1, wherein said voltage waveform detector detects a negative peak voltage value of the voltage applied to an anode of the rectifier diode.

6. The switching regulator according to claim 1, wherein the switching regulator performs fly-back power conversion.

7. A control method of a switching regulator, comprising:
    a voltage waveform detection step of inputting a voltage applied to a rectifier diode connected in series with a secondary side of a transformer and generating a first voltage signal corresponding to the input voltage;
    a first control step of calculating a voltage value inputted into a primary side of the transformer, based on a voltage value of the first voltage signal generated in said voltage waveform detection step;
    a clamping step of clamping the voltage applied to the rectifier diode connected in series with the secondary side of the transformer;
    an integrating step of inputting and integrating a second voltage signal claimed in said clamping step; and
    a second control step of calculating a current value inputted to the primary side of the transformer, based on the voltage value inputted to the primary side of the transformer and a period of the second voltage signal integrated in said integrating step.

8. The control method according to claim 7, wherein said voltage waveform detection step including:
    an amplifying step of amplifying the voltage applied to the rectifier diode; and
    a holding step of holding an output amplified in said amplifying step.

9. The control method according to claim 8, wherein the voltage value of the first voltage signal is Vvp and the voltage value inputted to the primary side of the transformer is Vin, the voltage value Vin is calculated in said first control step by
    $Vin = N1 \times Vvp/\sqrt{2} \times \alpha N2$, wherein N1 is the number of windings of the primary side of the transformer, N2 is the number of windings of the secondary side of the transformer, and $\alpha$ is the gain in said amplifying step.

10. The control method according to claim 7, wherein, the current value inputted to the primary side of the transformer is Iin, the voltage value inputted to the primary side of the transformer is Vin, and the voltage value of the second voltage signal integrated in said integrating step is Viin, and a clamp voltage value in said clamping step is Vz, the current value Iin is calculated in said second control step by
    $Iin = \sqrt{2} Vin \times t2 \times Viin^2 / 2L1 \times \beta^2 Vz^2$, wherein L1 is primary inductance of the transformer, $\beta$ is the gain of said integrating circuit, and t2 is the period of the second voltage signal.

11. The switching regulator control method according to claim 7, wherein in said voltage waveform detection step, a negative peak voltage value of the voltage applied to an anode of the rectifier diode is detected.

12. The switching regulator control method according to claim 7, wherein the switching regulator performs fly-back power conversion.

* * * * *

UNITED STATES PATENT AND TRADEMARK OFFICE
CERTIFICATE OF CORRECTION

PATENT NO. : 7,355,864 B2
APPLICATION NO. : 11/058239
DATED : April 8, 2008
INVENTOR(S) : Matsumoto Page 1 of 2

It is certified that error appears in the above-identified patent and that said Letters Patent is hereby corrected as shown below:

COVER PAGE:
    Item (56) Foreign Patent Documents, "09/093910" should read -- 9-093910 --.

DRAWINGS:
    Sheet 15, FIG. 15, in block S6, "BTAIN" should read -- OBTAIN --.

COLUMN 3:
    Line 46, "(warming up" should read -- warming-up --; and
    Line 58, "with" should be deleted.

COLUMN 4:
    Line 2, "with" should be deleted;
    Line 6, "supply-configured" should read -- supply configured --; and
    Line 21, "sub-combination" should read -- a sub-combination --.

COLUMN 5:
    Line 10, "sowing" should read -- showing --; and
    Line 63, "13" should be deleted.

COLUMN 6:
    Line 51, "gain a" should read -- gain $\alpha$ --.

COLUMN 7:
    Line 31, "Fig. 2. In" should read -- Fig. 2, in --; and

Line 60, " *Iin*=$\sqrt{2}$ VinXtl$^2$/2t2xL1" should read -- *Iin*=$\sqrt{2}$ VinXtl$^2$/2t$^2$xL1 --.

COLUMN 8:
    Line 6, "βand" should read -- β and --.

Signed and Sealed this

Eighteenth Day of May, 2010

David J. Kappos
*Director of the United States Patent and Trademark Office*

COLUMN 10:
    Line 20, "as" should be deleted;
    Line 23, "primary-second" should read -- primary-secondary --;
    Line 29, "(warming up" should read -- warming-up --; and
    Line 66, "appraise" should read -- apprise --.

COLUMN 12:
    Line 16, "claimed" should read -- clamped --; and
    Line 23, "including:" should read -- includes: --.